United States Patent
Likar et al.

(10) Patent No.: US 10,945,167 B2
(45) Date of Patent: Mar. 9, 2021

(54) CONTROLLING TRANSITIONS BETWEEN ACCESS POINTS WITH DYNAMIC RSSI (RECEIVED SIGNAL STRENGTH INDICATOR) THRESHOLDS FOR STICKY-CLIENT STATIONS OF CLOUD-CONTROLLED WI-FI NETWORKS

(71) Applicant: Neutrino8, Inc., Santa Clara, CA (US)

(72) Inventors: Bojan Likar, Cupertino, CA (US); Ihab Abu-Hakima, Los Altos, CA (US)

(73) Assignee: Neutrino8, Inc., Santa Clara, CA (US)

( * ) Notice: Subject to any disclaimer, the term of this patent is extended or adjusted under 35 U.S.C. 154(b) by 0 days.

(21) Appl. No.: 16/436,834

(22) Filed: Jun. 10, 2019

(65) Prior Publication Data

US 2019/0297546 A1    Sep. 26, 2019

Related U.S. Application Data

(63) Continuation-in-part of application No. 15/715,163, filed on Sep. 26, 2017, now Pat. No. 10,432,463, which is a continuation-in-part of application No. 15/390,426, filed on Dec. 23, 2016, now abandoned.

(51) Int. Cl.
  *H04W 36/00*    (2009.01)
  *H04B 17/327*    (2015.01)
  *H04W 36/30*    (2009.01)
  *H04W 36/32*    (2009.01)

(52) U.S. Cl.
  CPC .... *H04W 36/00837* (2018.08); *H04B 17/327* (2015.01); *H04W 36/0094* (2013.01); *H04W 36/00835* (2018.08); *H04W 36/30* (2013.01); *H04W 36/32* (2013.01)

(58) Field of Classification Search
  None
  See application file for complete search history.

(56) References Cited

U.S. PATENT DOCUMENTS

| | | | |
|---|---|---|---|
| 7,593,731 B2* | 9/2009 | Lim | H04W 36/26 455/436 |
| 2006/0256763 A1 | 11/2006 | Nguyen | |
| 2010/0241854 A1* | 9/2010 | Yao | H04W 36/0016 713/168 |
| 2012/0020240 A1* | 1/2012 | Miura | H04W 72/02 370/252 |
| 2012/0309394 A1* | 12/2012 | Radulescu | H04W 84/105 455/436 |
| 2013/0095819 A1* | 4/2013 | Cheng | H04W 36/0094 455/424 |
| 2014/0242982 A1* | 8/2014 | Yang | H04W 36/0083 455/434 |
| 2014/0331296 A1* | 11/2014 | Faccin | H04W 48/20 726/6 |

(Continued)

*Primary Examiner* — Shripal K Khajuria
(74) *Attorney, Agent, or Firm* — Law Office Of Dorian Cartwright; Dorian Cartwright

(57) ABSTRACT

A cloud-based Wi-Fi controller facilitates forced transitions. Dynamic RSSI thresholds for sticky-client stations are calculated and periodically updated based on changing conditions. When measured RSSI values reach a dynamic RSSI threshold, the cloud-based Wi-Fi controller reassociates the sticky-client station with a preferred access point, regardless of whether the sticky-client station has reached the same determination.

9 Claims, 9 Drawing Sheets

(56) References Cited

U.S. PATENT DOCUMENTS

| | | | |
|---|---|---|---|
| 2015/0003410 A1* | 1/2015 | Yang | H04W 36/0058 370/331 |
| 2015/0350953 A1* | 12/2015 | Himayat | H04W 28/08 370/235 |
| 2016/0007278 A1* | 1/2016 | Gupta | H04W 48/20 370/329 |
| 2016/0212695 A1 | 7/2016 | Lynch | |
| 2016/0366638 A1* | 12/2016 | Kumar | H04W 52/0206 |

* cited by examiner

US 10,945,167 B2

CONTROLLING TRANSITIONS BETWEEN ACCESS POINTS WITH DYNAMIC RSSI (RECEIVED SIGNAL STRENGTH INDICATOR) THRESHOLDS FOR STICKY-CLIENT STATIONS OF CLOUD-CONTROLLED WI-FI NETWORKS

CROSS-REFERENCE TO RELATED APPLICATIONS

This application claims the benefit of priority as a continuation-in part under 35 U.S.C. 120 to U.S. application Ser. No. 15/390,426, filed Dec. 23, 2016, and commonly owned, and claims the benefit of priority as a continuation-in-part to U.S. application Ser. No. 15/715,163, filed Sep. 26, 2017, and commonly owned, the contents of which each being hereby incorporated by reference in their entirety.

FIELD OF THE INVENTION

The invention relates generally to a computerized networking system, and more specifically, to forcing transitions between access points with dynamic RSSI thresholds for sticky-client stations of cloud-controlled Wi-Fi networks.

BACKGROUND

Wireless stations typically control interactions with network components on data communication networks. During the initial connection with the network, wireless stations survey for SSIDs of one or more networks, and per IEEE 802.11 network protocol, choose which SSID to associate with. In one case, sticky-clients can hang on to a bad network connection, even when a markedly better network connection is available. A final decision on when a station leaves the bad connection and roams for a better connection, varies among different station types, and also among different vendors and is very often not even published by vendors. The sticky-client behavior can operate at lower transmission speeds, taking away channel time from other stations. As a result, network components such as access points can have negative performance impacts from the bad network connection.

One network protocol, IEEE 802.11r, returns control to the networks from stations by allowing forced hand-offs. However, non-IEEE 802.11r stations remain numerous and do not have the native capability of controlling stations from a network perspective. This can be disruptive to enterprise networks by reducing network quality of service for applications executing on these sticky-client stations.

What is needed is a robust technique for cloud-controlled transitions between access points with dynamic RSSI thresholds for sticky-client stations of Wi-Fi networks, outside of the IEEE 802.11r network protocol.

SUMMARY

The above-mentioned needs are met with methods, computer products, and devices for a computer-implemented method for forcing transitions between access points with dynamic RSSI thresholds for sticky-client stations of cloud-controlled Wi-Fi networks.

In one embodiment, a neighbor list for a specific wireless station connected through a first access point is periodically received. The neighbor list identifies access points within range of the specific wireless station and an RSSI value as measured between the specific wireless station and the neighboring access points. The specific wireless station adheres to a network protocol allowing the specific wireless station to hang on to a bad connection as a sticky client.

In one embodiment, a dynamic RSSI threshold indicating when the specific wireless station is to be handed off from the first access point to one of the neighboring access points is calculated and periodically updated. The dynamic RSSI threshold, in an embodiment, is based on a highest of RSSI values for the neighboring access points.

In another embodiment, the network determines that the specific wireless station will be handed-off. At times, the specific wireless station can initiate its own hand-off prior to network action. To make the determination, RSSI measurement between the first access point and the specific wireless station from the periodically received RSSI measurements is identified. The measured RSSI value between the first access point and the specific wireless station is periodically compared to the dynamic RSSI threshold. Responsive to a hand-off trigger by the network, instructions are transmitted to disassociate the first access point from the specific wireless station and to transmitting instructions to associate the second access point with the second wireless station for connection to the data communication system.

Advantageously, wireless station, and thus, network quality of service is improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, (non-transitory) computer program products, and systems for forcing transitions between access points with dynamic RSSI thresholds for sticky-client stations of cloud-controlled Wi-Fi networks, as described herein. One of ordinary skill in the art will recognize variations to the disclosed embodiments that are contemplated, although not explicitly described.

I. Systems for Forced Transitions of Sticky-Client Stations (FIGS. 1-5)

Figure 1A:
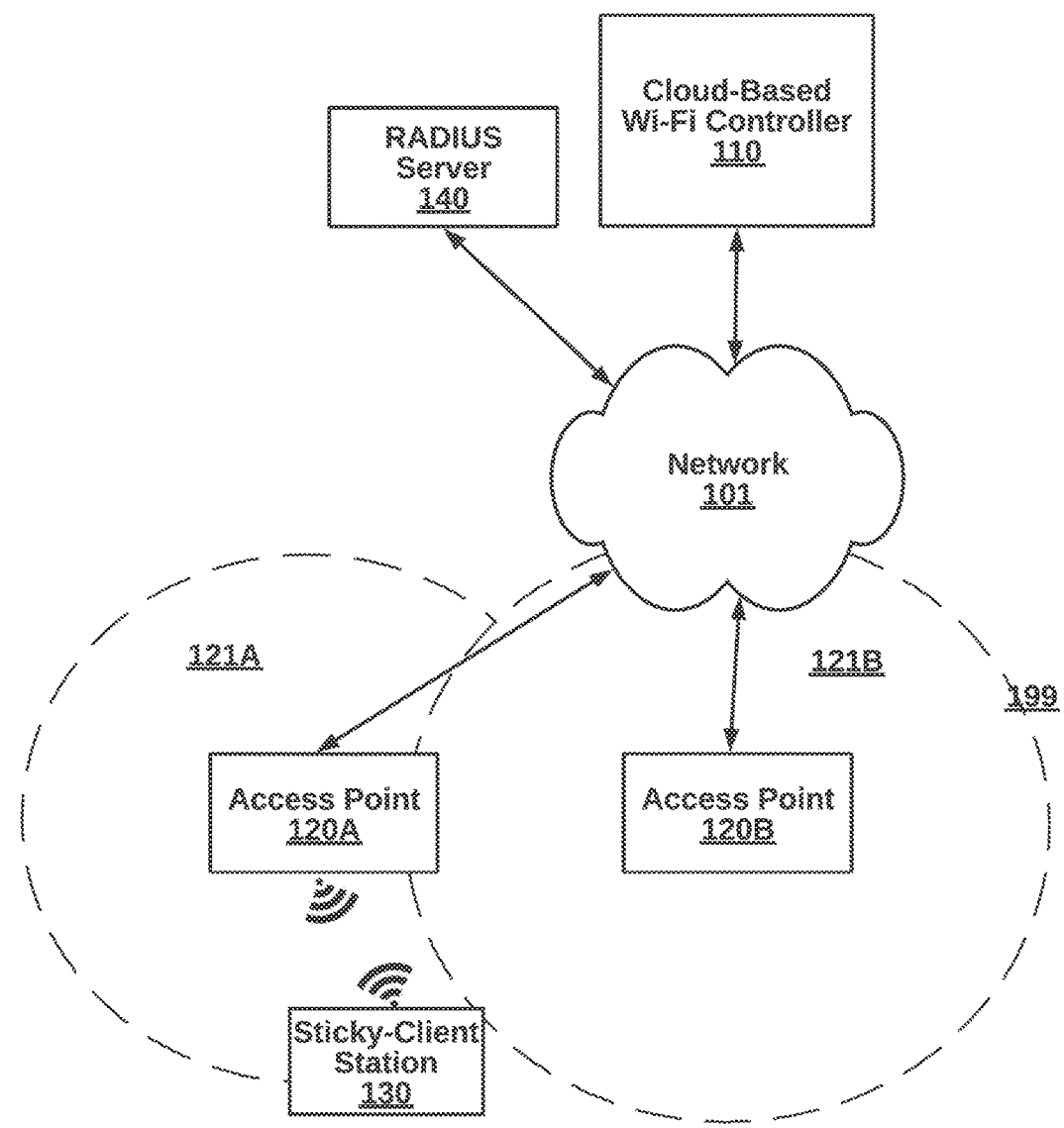
FIGS. 1A and 1B are high-level block diagrams illustrating a system for forcing transitions between access points with dynamic RSSI thresholds for sticky-client stations of cloud-controlled Wi-Fi networks, according to an embodiment.
Figure 1B:
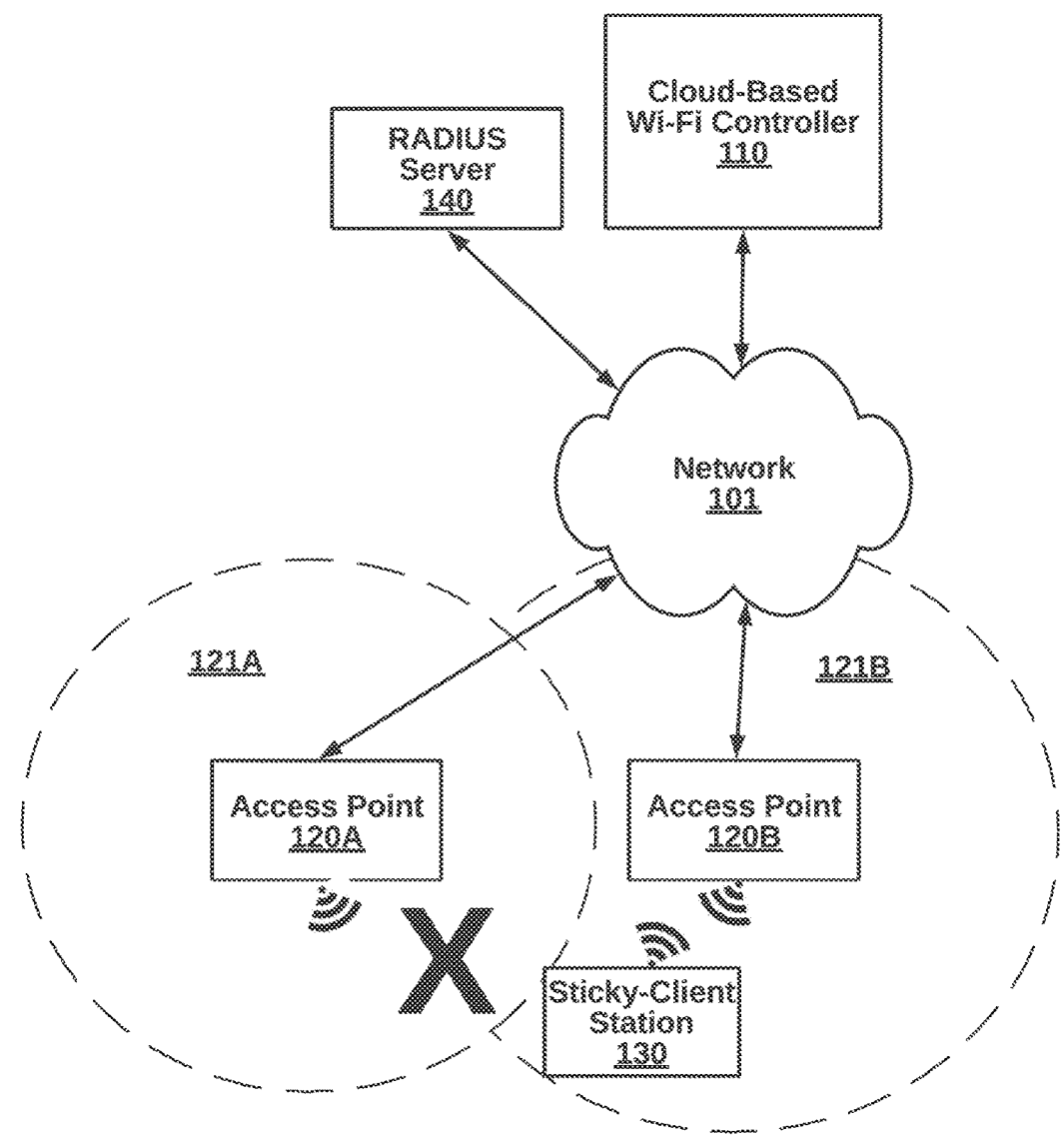

FIG. 1A is a high-level block diagram illustrating a system 100 for forcing transitions between access points with dynamic RSSI thresholds for sticky-client stations of cloud-controlled Wi-Fi networks, according to an embodiment. FIG. 1B shows the system 100 after a forced hand-off according to the techniques described herein.

The system 100 comprises a cloud-based Wi-Fi controller 110, access points 120A,B, a wireless station 130, and RADIUS server 140. In other embodiments of the system 100, additional network components can also be part of the systems, such as firewalls, virus scanners, routers, switches, application servers, databases, as well as additional controllers, access points, access switches, stations, and the like. The network components as set forth throughout the different embodiments described herein can be implemented as hardware, software, or a combination of both. The system 100 can be implemented in home networking systems with easy consumer set-up. Also, the system 100 can be implemented in enterprise networking systems for quick deployment without the need for a network administrator.

The components of the system 100 can communicate by transmitting data through a network 101. More specifically, the network 101 couples the cloud-based Wi-Fi controller 110 to the access point 120, preferably over a wired connection. The network 101 can be the Internet, a wide area network, a local area network, an enterprise network, or the like. The network 101 can be a data network or a cellular network (e.g., 3G, 4G or 5G), or a combination of different types of networks. A cellular-to-data network unit 102 can couple the sticky-client station 130 to the cloud-based Wi-Fi controller 110 via the network 101. The sticky-client station 130 connects over Wi-Fi to the access points 120A or 120B.

The cloud-based Wi-Fi controller 110 continuously updates dynamic RSSI thresholds for sticky-client station 130 and others, as conditions around the network change. More specifically, as new access points are inserted and removed from the wireless grid, and as station loads on access points increase and decrease, the point in which a particular sticky-client transitions should be forced, changes. RSSI values are periodically sent upstream to the cloud-based Wi-Fi controller 110 from access points and sticky clients. Updated RSSI values are indicative can trigger a recalculated dynamic RSSI threshold for sticky-client stations associated with updated RSSI values. Various implementation-specific algorithms can be implemented for different networks. One embodiment determines when the RSSI value for a neighboring access point surpassed the RSSI value for a currently connected access point. Another embodiment weighs towards a particular access point, for example, by taking into account a current trajectory path causing RSSI values of a neighboring access point to increase at a higher rate than high RSSI value access points not consistent with the current trajectory. Yet another embodiment considers linear distances (e.g., from triangulation or reading nearby location tags) from stick-clients to access points. Still another embodiment considers factors that affect the RSSI value such as processor load, network congestion, and the like. Generally, RSSI I san estimated power level that an RF (radio frequency) client device is receiving from an access point or router. At larger distances, the signal gets weaker and wireless data rates get slower, leading to a lower overall data throughput.

In an embodiment, neighbor lists are periodically compiled and transmitted from sticky-clients to the cloud-based Wi-Fi controller 110 regarding access points within range. In other embodiments, access points report RSSI values of clients within range. The neighbor lists can be stored in memory as a table for searching when dynamic RSSI thresholds are calculated.

When a hand-off condition is detected, a hand-off to a new access point can be compelled from the cloud, regardless of whether the sticky-client The cloud-based Wi-Fi controller 110 and other components of the system 100 can be any computerized device or processor driven device. Example embodiments include server blades, desktop computers, laptops, smart telephones, tablets, phablets and the like. In some cases, the cloud-based Wi-Fi controller 110 is operated by a service provider that services various user accounts for different users. In other cases, the cloud-based Wi-Fi controller 110 is owned by the same entity the owns associated access points. The cloud-based Wi-Fi controller 110 can be manufactured by the same entity that manufactures the access points 120A,B, or not. More detailed embodiments of the cloud-based Wi-Fi onboarding server 110 are set forth below with respect to FIG. 2.

The access points 120A,B service the sticky-client station 130 according to instructions received from the cloud-based Wi-Fi controller 110. For example, the access point 120A receives dynamic RSSI thresholds for associated sticky-client stations, as in FIG. 1A. Measured RSSI values received from the sticky-client stations can be compared against the dynamic RSSI thresholds to determine whether a compelled transition should be performed. The actual RSSI values as measured can be from the perspective of data packets received by the sticky-client station 130, or alternatively, from the perspective of the cloud-based Wi-Fi controller 110. At this point, the sticky-client is disassociated from the access point 120A and reassociated with the access point 120B, as in FIG. 1B. In another embodiment, the access point 120B also measures RSSI values corresponding to the sticky-client station 140. Rather than disassociating responsive to RSSI measurements falling below a dynamic RSSI threshold as it moves away, the access point 120B associates responsive to RSSI measurements rising above a dynamic RSSI threshold. The cloud-based Wi-Fi controller 110 can also make the decision responsive to receiving measured RSSI values from one access point, from both access points, or from both access points and stations. There are situations when either access point could equally serve the sticky-client station 130 based on RSSI analysis, and secondary factors become determinative.

More generally, the access points 120A,B provide access to the network 101 for wireless stations (e.g., wireless station 130). The access points 120A,B can each be a traditional access point, or be a hybrid access point, router, switch, or the like. More detailed embodiments of the master base station 130 are described in below with respect to FIG. 3.

The sticky-client station 130 moves from access point to access point as directed by the cloud-based cloud-controller. In some embodiment, the stick-client station 130 is incompatible with IEEE 802.11r networking standards.

In another embodiment, the sticky-client station 130 provides a user interface (e.g., a web browser or mobile app) for a user that wants to configure a user profile on the cloud-based Wi-Fi controller 110. For example, a dashboard for a user account can show authorized network and new access points of the same user or of different users can be associated with a user device through the user profile. Additionally, the user interface can allow a network administrator to enter dynamic RSSI values manually, or to enter data used for calculating dynamic RSSI values (e.g., location coordinates of a mounted access point).

Figure 8:
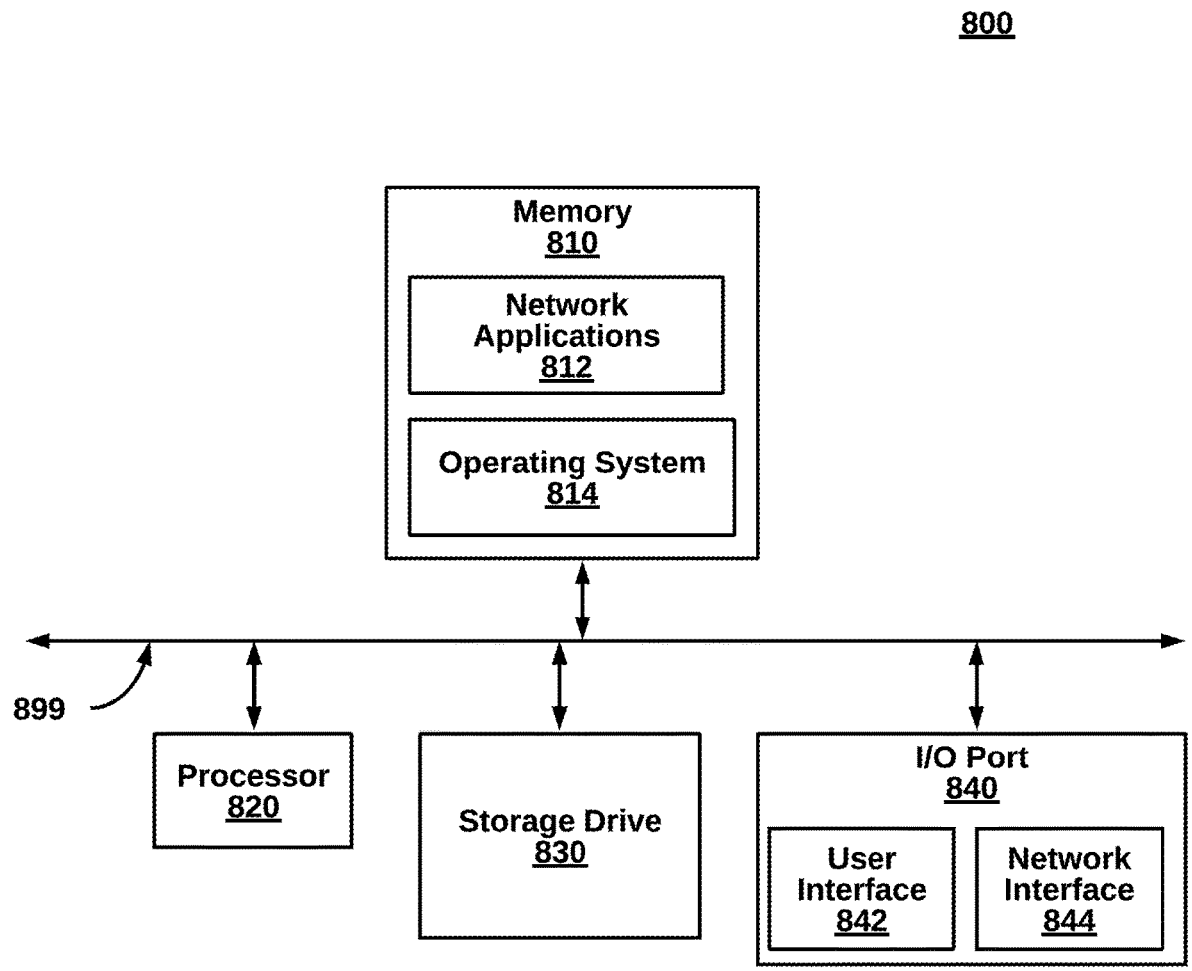
FIG. 8 is a block diagram illustrating an exemplary computing device for implementing the techniques described herein, according to one embodiment.

In some embodiments, the sticky-client station 130 can be a mobile telephone, a tablet, a phablet, a laptop, or be implemented by any of the computerized devices discussed herein, and generally in FIG. 8. For instance, a smart phone is typically equipped with Wi-Fi and cellular data network transceivers. A mobile app can be downloaded to coordinate between the heterogeneous communication channels and for communication with the cloud-based Wi-Fi onboarding server 110. Examples sticky-client station 130 is described in more detail below in association with FIG. 4.

The RADIUS server 140 authenticates wireless stations using Authentication, Authorization, and Accounting (AAA) management for users, in an embodiment. RADIUS is a client/server protocol that runs in the application layer, and can use either TCP or UDP as transport between a RADIUS client (e.g. a NAS (network access server) device) and a RADIUS server. For example, the RADIUS server 140 can pass an Accept or Reject message to a NAS client, once authentication is complete. The NAS client will then permit or reject connection of a wireless station to the network. One problem with the prior art, as discussed above, is that the RADIUS server 140 is part of each hand-off for wireless stations (e.g., between ISPs (Internet Service Providers)). One example of the RADIUS server 140 implements RFC2865 and RFC2866 RADIUS authentication and accounting protocols.

Figure 2:
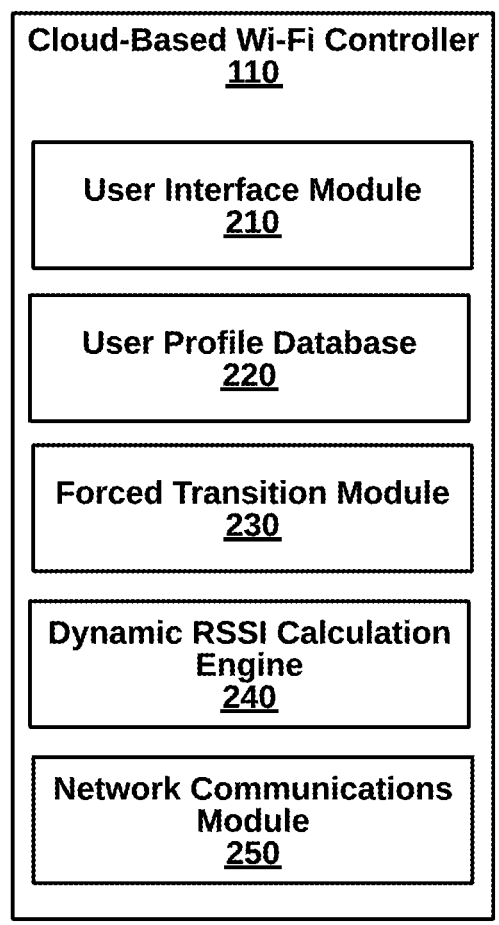
FIG. 2 is a more detailed block diagram illustrating a cloud-based Wi-Fi controller of the system of FIGS. 1A-B, according to one embodiment.

FIG. 2 is a more detailed block diagram illustrating a cloud-based Wi-Fi controller 110 of the system of FIGS. 1A-B, according to one embodiment. The cloud-based Wi-Fi controller 110 of this embodiment includes a user interface module 210, a user profile database 220, a forced transition module 230, a network policies and rules engine 240, and a network communication module 250.

The user interface module 210 provides access for users through a network browser or client-side mobile app, for example, for authentication and other fast hand-off policies. In one embodiment, high level settings are provided for average home users. In another embodiment, granular settings are provided for network administrators to set configurations. Settings can be saved as rules that are applied against data for fast BSS transitions. The user profile database 220 can save specific settings on a per-user, per-institution, per-entity basis, for instance.

The forced transition module 230 communicates with sticky-client stations and also with access points to pre-populate access points with dynamic RSSI thresholds for associated stations, stations within range, or even for stations that are not yet in range. In one embodiment, an app running on a wireless device authenticates a user, in order to move BSS transition control to the cloud (e.g., cloud-based Wi-Fi controller). In one embodiment, the forced transition module 230 determines when a hand-off is necessary rather than waiting for the access point to initiate the hand-off. In one case, the hand-off is triggered by conditions on the Wi-Fi network, while in another case, the hand-off is triggered by a low RSSI between a current access point and a wireless device. In still another case, the hand-off is triggered because a VOIP app is running and needs a certain QoS (quality of service).

The dynamic RSSI calculation engine 240 implements specific rules for calculating dynamic RSSI threshold. In one example, specific rules are derived from network policies, user profile settings, or network device conditions.

The networking communication module 250 can comprise networking interface components such as Wi-Fi radios, Wi-Fi antennae, transceivers, coders and decoders, digital signal processors, and other supporting lower level hardware and processes necessary for communication across channels.

Figure 3:
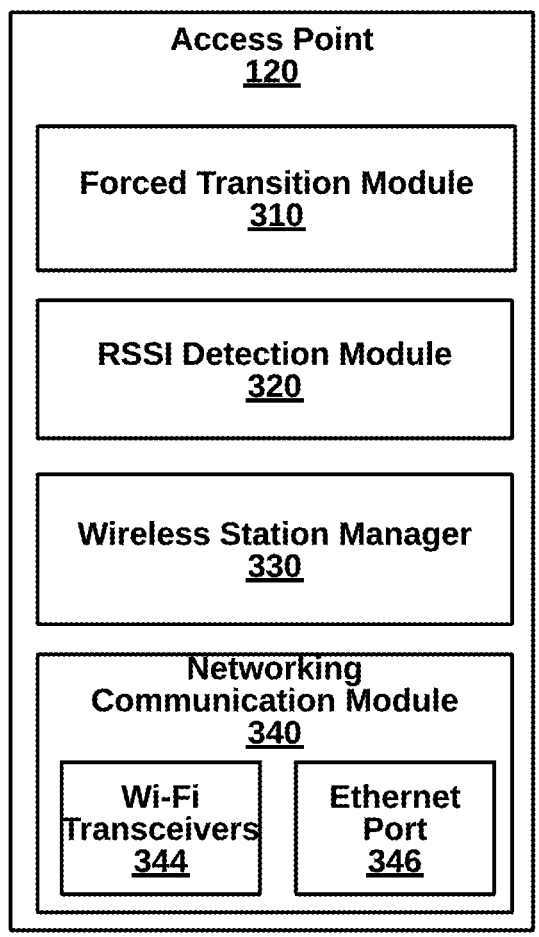
FIG. 3 is a more detailed block diagram illustrating an access point of the system in FIGS. 1A-B, according to one embodiment.

FIG. 3 is a more detailed block diagram illustrating a access point 120 (representative of either the access point 120A or the access point 130) of the system 100 of FIGS. 1A-B, according to one embodiment. The access point 120 includes an onboarding application 310, an authentication module 320, a wireless station manager 330, and a networking communication module 340.

In an embodiment, the forced transition module 310 calls the cloud-based Wi-Fi controller 110 across the network 101 upon activation. Dynamic threshold values can be stored in the forced transition module 310. The RSSI detection module 320 measures RSSI values from received packets. In some embodiments, RSSI values measured form the sticky-client station 130 are extracted from data packets received from the sticky-client station 130 through control messages.

The wireless station manager 330 registers wireless stations directly connecting under the techniques described herein. In some cases, wireless stations can be handed off to other access points.

The networking communication module 340 comprises a Wi-Fi transceiver 344 and an Ethernet port 346. In one instance, IEEE 802.11 network packets are received from wireless stations and are transformed to Ethernet packets forwarded to the destinations on the network 101. The reverse data path is also handled by the networking communication module 340. Other embodiments with different transceivers are possible.

Figure 4:
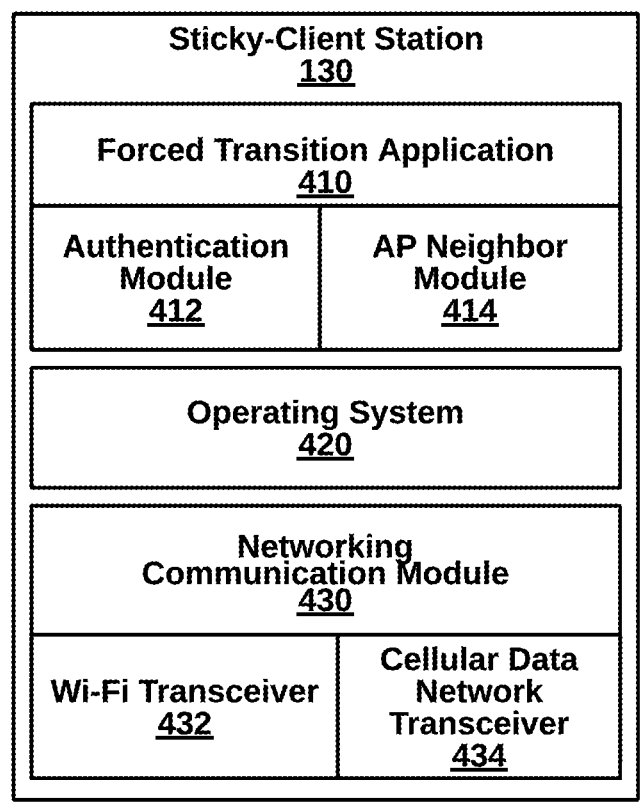
FIG. 4 is a more detailed block diagram illustrating a sticky-client station of the system of FIGS. 1A-B, according to an embodiment.

FIG. 4 is a more detailed block diagram illustrating the sticky-client station 130 of the system of FIGS. 1A-B, according to an embodiment. The sticky-client station 130 includes a fast BSS application 410, an operating system 420, and a networking communication module 430.

The forced transition application 410, is optional, for optimizing forced transitions at the sticky-client station 130. The forced transition application 410 may communicate directly with the cloud-based Wi-Fi controller 110 to provide on-demand RSSI measurements. The forced transition application 410 can be downloaded from an app store, can execute on a native browser, or can be integrated with an operating system. The forced transition application 410 can further comprise an authentication module 412 passes log-in credentials for a secure connection with the cloud-based Wi-Fi controller 110. Additionally, a neighbor module 414 pings to discover neighboring access points, and pass a compiled list with RSSI values to the cloud-based Wi-Fi controller 110.

The networking communication module 430 includes hardware and software implementing lower level networking functionalities. In particular, a Wi-Fi transceiver 432 couples to a Wi-Fi device (e.g., network device 120) for data communications. Optionally, SMS provides data communications. A cellular data network transceiver 434 couples to a cell tower (e.g., the cellular-to-data network unit 102) for data communications. Optionally, SMS provides data communications.

Figure 5:
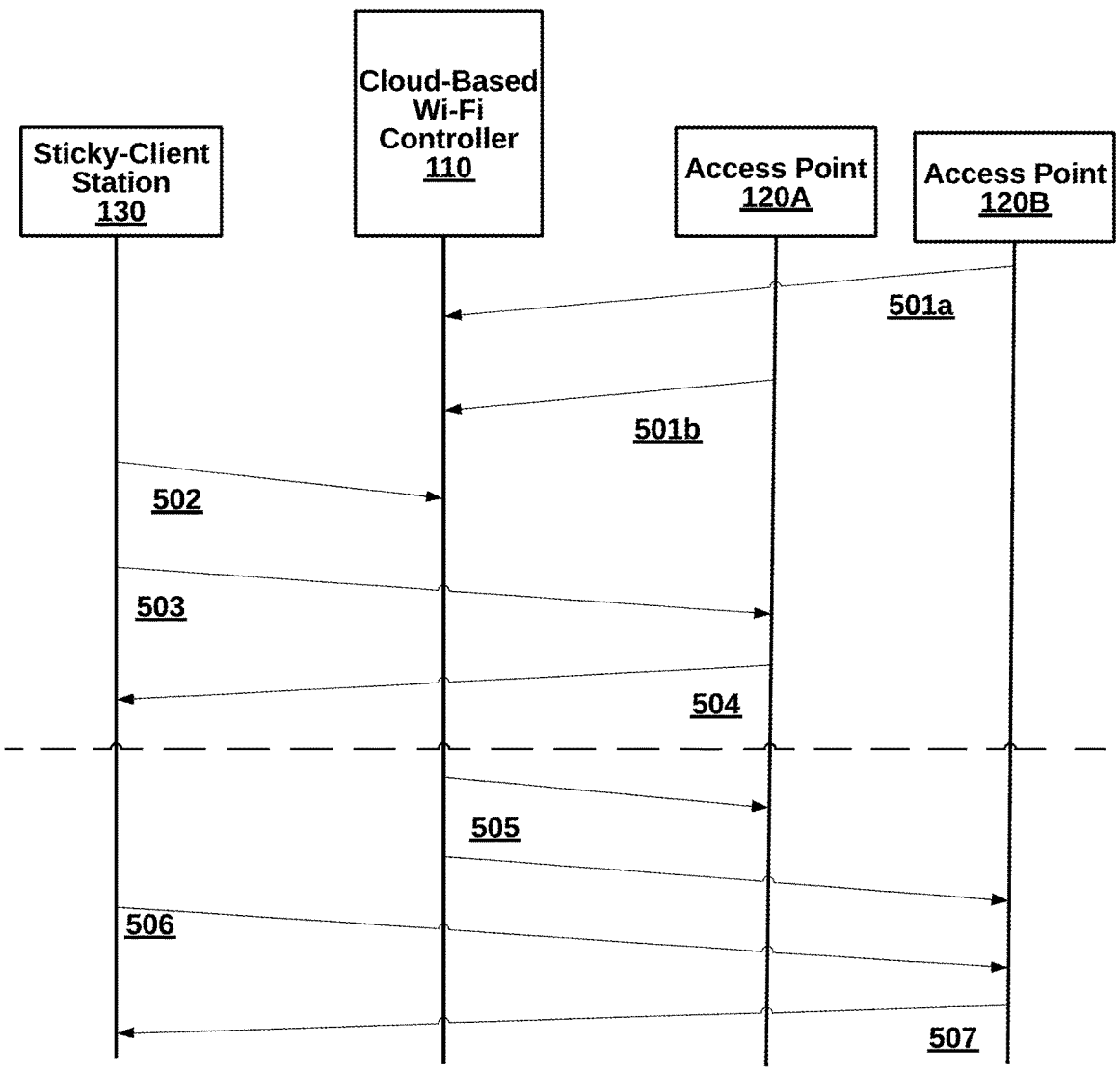
FIG. 5 is a sequence diagram illustrating interactions between components of the system in FIGS. 1A-B, according to one embodiment.

FIG. 5 is a sequence diagram 500 illustrating interactions between components of the system in FIGS. 1A-B, according to one embodiment. The specific interactions described below can be performed in different orders, can include many sub-interactions, and still be contemplated by the present disclosure. Moreover, the method below of FIG. 6-7 describes processes that can operate be internal to the components, as opposed to the external messages exchanged in FIG. 5.

Returning to FIG. 5, the access points 120A and 120B send log in messages to the cloud-based Wi-Fi controller 110 upon power up, reboot, opening of an app, or the like (interactions 501a,b). Similarly, the sticky-client station 130 sends log-in messages to the cloud-based Wi-Fi controller 110 upon power up, reboot, opening of an app, or the like (interaction 502). There can be several interactions back and forth although only one representative interaction is shown. Additionally, there can be set-up, RADIUS authentication and registration processes that occur during interactions 501, 502 or beforehand. As a result, the wireless station exchanges data with the access point for access to a data communication network (interactions 503, 504). Once a dynamic RSSI threshold has been triggered, the cloud-based Wi-Fi controller 110 forces the transition of the sticky-client station 130 by disassociating access point 120A (interaction 505) and reassocating access point 120B (interaction 506). In this result, the sticky-client station 130 continues access to the data communication network with the new host (interactions 507, 508).

II. Methods for Forcing Transitions for Sticky-Client Stations (FIGS. 6-7)

Figure 6:
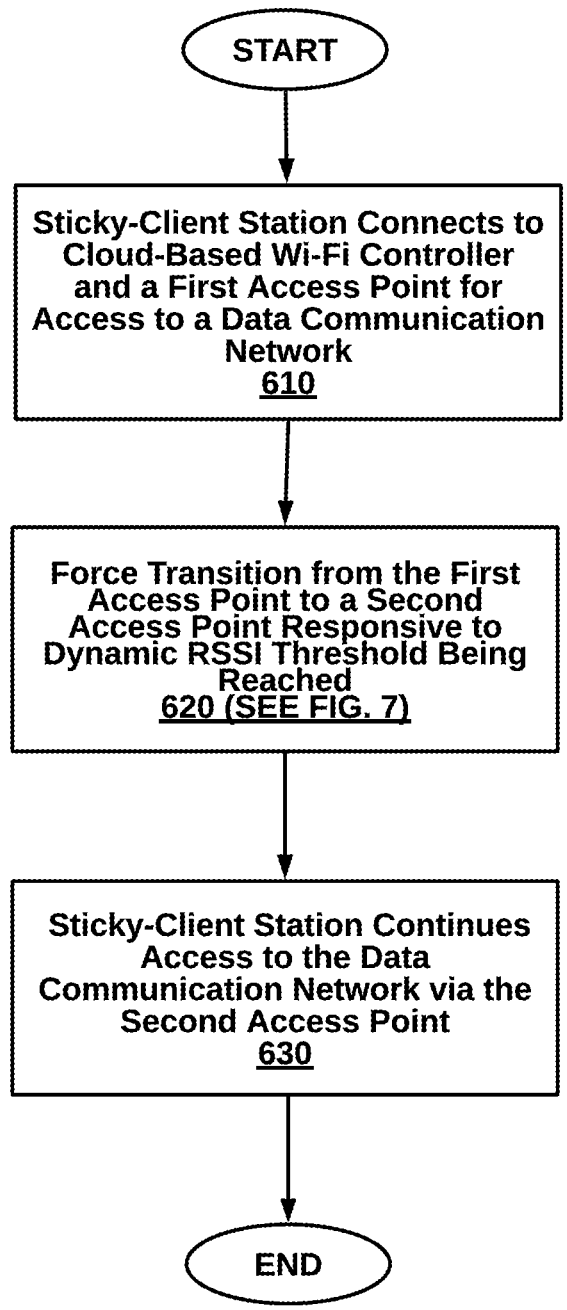
FIG. 6 is a high-level flow diagram illustrating, from the perspective of a cloud-based Wi-Fi controller, a method for forcing transitions between access points with dynamic RSSI thresholds for sticky-client stations of cloud-controlled Wi-Fi networks, according to one embodiment.
Figure 7:
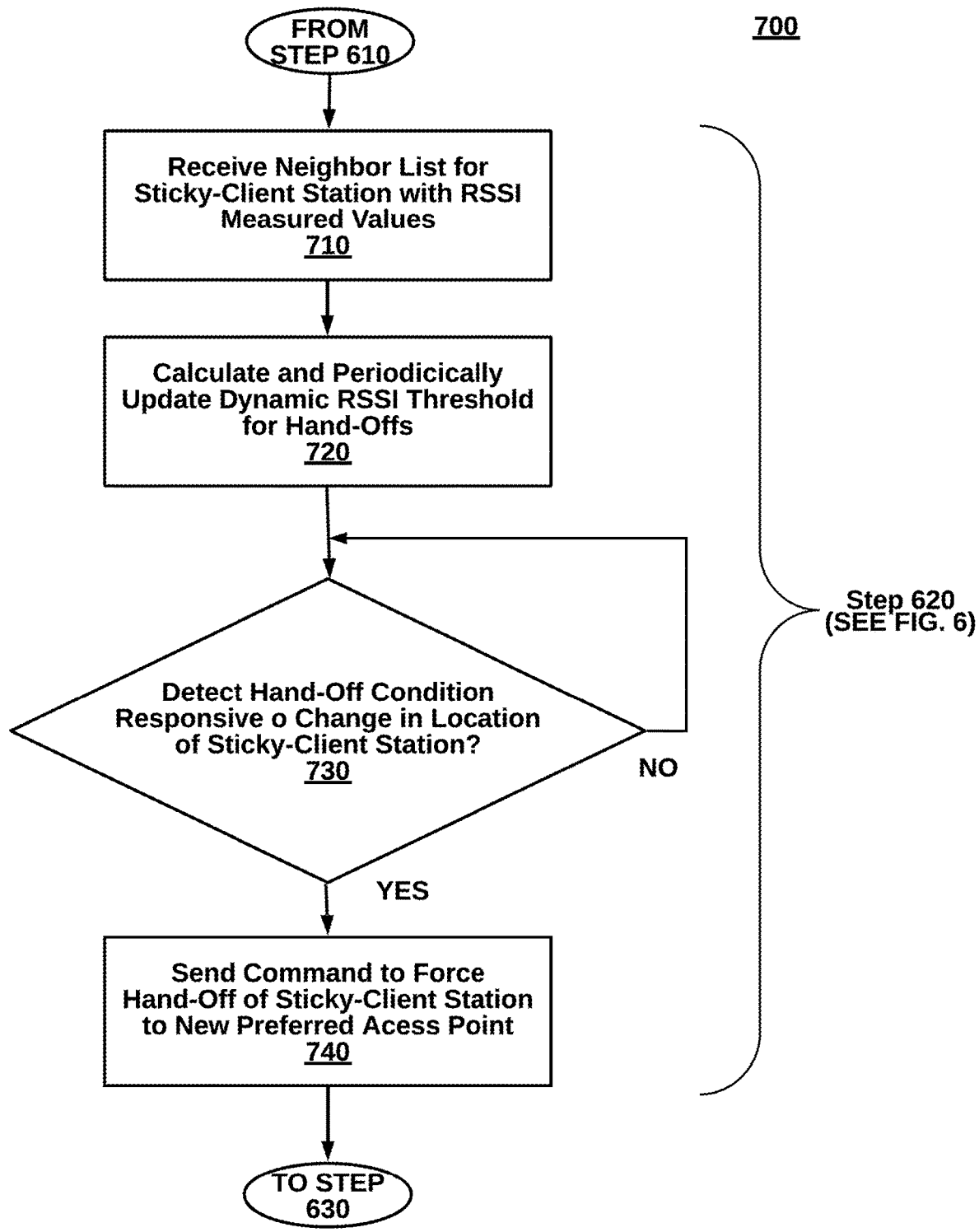
FIG. 7 is a more detailed flow diagram illustrating, from the perspective of a network device, a method for forced transitions between access points for sticky-client stations of cloud-controlled Wi-Fi networks, according to one embodiment.

FIG. 6 is a flow diagram illustrating a method 600 for forcing transitions between access points with dynamic RSSI thresholds for sticky-client stations of cloud-controlled Wi-Fi networks.

At step 610, a sticky-client station connects to a cloud-based Wi-Fi controller and a first access point for access to a data communication network.

At step 620, the sticky-client station is forced to transition from the first access point to a second access point responsive to a dynamic RSSI threshold being reached. One example is explained in detail below in association with FIG. 7.

At step 630, the user device continues using the data communication network via the second access point without a noticeable change in network performance. For example, a videocall QOS can be supported and maintained during a forced transition of access points.

Turning to FIG. 7, more details are provided for the forced transition step 620 of FIG. 6. At step 710, a neighbor list is received at the cloud-based Wi-Fi controller from a network device connected to the data communication system through a first access point. The neighbor list identifies the sticky-client station and other stations within range of the network device.

At step 720, dynamic RSSI thresholds are calculated and periodically updated. At step 730, a hand-off condition is detected responsive to a change in location of the sticky-client station, and at step 740, commands are sent to force a hand-off of the sticky-client station to the second access point.

III. Generic Computing Device (FIG. 8)

FIG. 8 is a block diagram illustrating an exemplary computing device 800 for use in the system 100 of FIG. 1, according to one embodiment. The computing device 800 is an exemplary device that is implementable for each of the components of the system 100, including the cloud based Wi-Fi Onboarding server 110, the network device 120, and the Wireless Station 130. The computing device 800 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 800, of the present embodiment, includes a memory 810, a processor 820, a storage drive 830, and an I/O port 840. Each of the components is coupled for electronic communication via a bus 899. Communication can be digital and/or analog, and use any suitable protocol.

The memory 810 further comprises network applications 812 and an operating system 814. The network applications 812 can include the modules of the components illustrated in FIG. 1. Other network applications 812 can include a web browser, a mobile application, an application that uses networking, a remote application executing locally, a network protocol application, a network management application, a network routing application, or the like.

The operating system 814 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 8 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 820 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 820 can be single core, multiple core, or include more than one processing elements. The processor 820 can be disposed on silicon or any other suitable material. The processor 820 can receive and execute instructions and data stored in the memory 88 or the storage drive 830.

The storage drive 830 can be any non-volatile type of storage such as a magnetic disc, EEPROM, Flash, or the like. The storage drive 630 stores code and data for applications.

The I/O port 840 further comprises a user interface 842 and a network interface 844. The user interface 842 can output to a display device and receive input from, for example, a keyboard. The network interface 844 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

IV. Additional Embodiments

Generally, one of ordinary skill in the art will recognize that the examples set forth herein are non-limiting and only illustrative of widely-applicable principles. Accordingly, this description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a cloud-based Wi-Fi control server of a data communication system, implemented at least partially in hardware, the method for forcing transitions between access points for sticky-client stations of cloud-controlled Wi-Fi networks based on dynamic RSSI (Received Signal Strength Indicator) thresholds to improve network performance, the method comprising the steps of:

periodically receiving, through a network interface of the Wi-Fi control server coupled to the data communication system, a neighbor list for a specific wireless station connected through a first access point, the neighbor list identifying access points within range of the specific wireless station and an RSSI value as measured between the specific wireless station and the neighboring access points, wherein the specific wireless station adheres to a network protocol allowing the specific wireless station to hang on to a bad connection as a sticky-client;

calculating and periodically updating with the periodic receipt of the neighbor list, with a processor of the Wi-Fi control server, a dynamic RSSI threshold indicating when the specific wireless station is to be handed off from the first access point to one of the neighboring access points, based on a highest of RSSI values for the neighboring access points;

determining that the specific wireless station is to be handed-off, comprising:

identifying an RSSI measurement between the first access point and the specific wireless station from the periodically received RSSI measurements, detecting a measured RSSI value between the first access point and the specific wireless station below the dynamic RSSI threshold, and determining a location and a direction of travel of the specific wireless station, wherein the dynamic RSSI threshold is also based on the location and the direction of travel and responsive to the hand-off determination, forcing the handoff by transmitting, through the network interface, instructions to disassociate the first access point from the specific wireless station and to transmitting instructions to associate the second access point with the second wireless station for connection to the data communication system.

2. The method of claim 1, wherein calculating the dynamic RSSI threshold comprises:

identifying the highest RSSI value between the specific wireless station and each of the neighboring access points, wherein the second access point is associated with the highest RSSI value and selecting the second access point as a destination of the hand-off.

3. The method of claim 1, wherein calculating the dynamic RSSI threshold comprises:

identifying the highest RSSI value between the specific wireless station and each of the neighboring access points;

wherein the second access point is not associated with the highest RSSI value and selecting the second access point as a destination of the hand-off due to at least one other factor.

4. The method of claim 1, wherein the forced handoff is performed according to network packets formatted according to the IEEE 802.11r protocol.

5. The method of claim 1, further comprising:

determining a location and a direction of travel of the specific wireless station, wherein the dynamic RSSI threshold is also based on the location and the direction of travel.

6. The method of claim 1, wherein the wireless station comprises at least one of: a smartphone, a laptop computer, a tablet device, and a wireless, mobile device.

7. The method of claim 1, wherein at least one of the plurality of access points is moved to a new location or adjusted within an existing location, triggering a change in the dynamic RSSI threshold.

8. The method of claim 1, wherein the periodic receipt of the neighbor list is triggered by at least one of: powering up, booting up, and expiration of a time period.

9. A non-transitory computer-readable media storing source code that, when executed, performs a computer-implemented method in a cloud-based Wi-Fi control server of a data communication system, implemented at least partially in hardware, for forcing transitions between access points for sticky-client stations of cloud-controlled Wi-Fi networks based on dynamic RSSI (Received Signal Strength Indicator) thresholds to improve network performance, the method comprising the steps of:

periodically receiving, through a network interface of the Wi-Fi control server coupled to the data communication system, a neighbor list for a specific wireless station connected through a first access point, the neighbor list identifying access points within range of the specific wireless station and an RSSI value as measured between the specific wireless station and the neighboring access points, wherein the specific wireless station adheres to a network protocol allowing the specific wireless station to hang on to a bad connection as a sticky-client;

calculating and periodically updating, with a processor of the Wi-Fi control server, a dynamic RSSI threshold indicating when the specific wireless station is to be handed off from the first access point to one of the neighboring access points, based on a highest of RSSI values for the neighboring access points;

determining that the specific wireless station is to be handed-off, comprising:
  identifying an RSSI measurement between the first access point and the specific wireless station from the periodically received RSSI measurements,
  detecting a measured RSSI value between the first access point and the specific wireless station below the dynamic RSSI threshold, and
  determining a location and a direction of travel of the specific wireless station, wherein the dynamic RSSI threshold is also based on the location and the direction of travel and responsive to the hand-off determination, forcing the handoff by transmitting, through the network interface, instructions to disassociate the first access point from the specific wireless station and to transmitting instructions to associate the second access point with the second wireless station for connection to the data communication system.

\* \* \* \* \*